(12) United States Patent
Weh et al.

(10) Patent No.: US 8,028,727 B2
(45) Date of Patent: Oct. 4, 2011

(54) ACTUATING DEVICE FOR A RAPID COUPLING

(76) Inventors: Erwin Weh, Illertissen (DE); Wolfgang Weh, Illertissen (DE)

( * ) Notice: Subject to any disclaimer, the term of this patent is extended or adjusted under 35 U.S.C. 154(b) by 610 days.

(21) Appl. No.: 11/915,260

(22) PCT Filed: May 19, 2006

(86) PCT No.: PCT/EP2006/004757
§ 371 (c)(1),
(2), (4) Date: Dec. 1, 2008

(87) PCT Pub. No.: WO2006/125566
PCT Pub. Date: Nov. 30, 2006

(65) Prior Publication Data
US 2009/0167019 A1 Jul. 2, 2009

(30) Foreign Application Priority Data
May 21, 2005 (DE) ............... 20 2005 008 155 U

(51) Int. Cl.
*B67C 3/00* (2006.01)
(52) U.S. Cl. ............... 141/200; 141/206; 141/218
(58) Field of Classification Search ............ 141/200, 141/206, 218, 301, 302, 346–349; 285/35, 285/311, 312, 316, 321, 322; 251/149.1
See application file for complete search history.

(56) References Cited

U.S. PATENT DOCUMENTS

| 2,686,626 | A | * | 8/1954 | Slattery | 141/207 |
| 3,168,125 | A | * | 2/1965 | Rosell | 141/346 |
| 3,513,887 | A | * | 5/1970 | Limandri | 141/207 |
| 4,794,960 | A | * | 1/1989 | Hawley et al. | 141/384 |
| 5,060,982 | A | * | 10/1991 | Matsushita | 285/190 |
| 5,301,723 | A | * | 4/1994 | Goode | 141/82 |
| 5,575,510 | A | * | 11/1996 | Weh et al. | 285/35 |
| 5,950,679 | A | * | 9/1999 | Danielson et al. | 138/89 |
| 6,099,044 | A | * | 8/2000 | Weh et al. | 285/33 |
| 6,375,152 | B1 | * | 4/2002 | Weh et al. | 251/149.6 |
| 2002/0069934 | A1 | | 6/2002 | Peattie | |

FOREIGN PATENT DOCUMENTS

| DE | 819366 C | 10/1951 |
| DE | 20317914 U1 | 12/2004 |
| EP | 0039977 A | 11/1981 |
| FR | 1055252 A | 2/1954 |
| WO | WO 93/20378 | 10/1993 |
| WO | WO 98/04866 | 2/1998 |

* cited by examiner

*Primary Examiner* — Timothy L Maust
(74) *Attorney, Agent, or Firm* — Knobbe Martens Olson & Bear LLP

(57) ABSTRACT

A simple design of an actuating device for a rapid coupling used for transferring gaseous and/or liquid fluids includes a tubular housing and a slide which is movably mounted relative to the housing and is coupled to a lever mechanism that is provided with at least one pivoted lever laterally mounted on the housing. At least one connecting lever extends to the slide on the pivoted lever, thus also obtaining safe handling.

19 Claims, 3 Drawing Sheets

ACTUATING DEVICE FOR A RAPID COUPLING

The invention relates to an actuating device for a rapid coupling for transferring gaseous and/or liquid fluids. Such an actuating device is known from Applicants' DE-GM 203 17 914.

Such rapid couplings shall ensure a secure and rapid connectability for transferring a fluid from a pressure source, for example from a gas tank at a filling station. The especially important aspect is the simple, easy usability of the rapid coupling, so that even under adverse conditions easy handling is enabled.

Such a rapid coupling is also described in WO 98/04866 of the Applicants, with the rapid coupling comprising a housing with a fluid inlet and a fluid outlet as well as several valves in order to ensure a secure sealing of the rapid coupling until the connection is completely established. Such valves are switched after application of the rapid coupling in a certain predetermined sequence, with the outlet valve being opened first by pushing the rapid coupling onto a connecting nipple, the tongs then being closed during further movement of a control lever as the actuating apparatus, and finally the inlet valve being opened. The control lever is in engagement via an eccentric shaft with the slide sleeve for pressuring the tongs and with a central sealing piston which releases the fluid inlet after the completed connection of the insert coupling.

Although a relatively secure possibility for connection is created in this way, the construction of this coupling is still relatively complex due to the plurality of components, which is also true for the actuating device mentioned at the beginning, although a single-hand operation is enabled by this.

Furthermore, WO-A-93/20378 of the Applicant discloses a rapid coupling, especially for filling gas cylinders, having a rapid coupling in the form of tongs with an engagement profile provided in the region of the outlet. There is also described a hollow sealing piston which is slidably movable within the coupling housing and is connected via a sliding sleeve with an actuating device for the closing and opening, respectively, of the tongs. Here, too, a separate operation of the actuating device in the form of a lever is required, such that the handling of this rapid coupling is also improvable.

The invention is thus based on the object of providing an actuating apparatus for a rapid coupling of the kind mentioned at the beginning or at valves, which allows a simpler configuration and a secure handling.

The object is achieved by an actuating apparatus for a rapid coupling for transferring gaseous and/or liquid fluids, comprising a tubular housing and a slide which is mounted in a manner that enables it to be displaced relative to the housing and which is coupled with a lever mechanism having a pivoting lever which is laterally mounted on the housing, wherein at least one connecting lever leading toward the slide is mounted on the pivoting lever. Preferred developments of the invention are the subject matter of the sub-claims.

The proposed actuating apparatus is characterized by an especially simple operation which moreover is especially secure. Especially the pivotable mounting of a connecting lever towards the slider achieves an operation of low friction beyond many years, which is important for the preferred embodiment for filling gas tanks with natural gas at filling stations. By this, a long lifespan with little wear and long maintenance rates are achieved, which all in all has a positive effect on secure operation.

Notice must be taken that the proposed actuating apparatus is suitable for different connecting shapes. For the connection of the coupling, profile shapes such as external/internal threads, clearance grooves, or beaded rims may be provided at the connecting nipple, with the opposing tong shape being formed in correspondence therewith. As a result of the lever mechanism being coupled with the actuating apparatus, a secure locking of the tongs or similar locking elements is enabled. Especially important is the realization of the actuating apparatus by means of a hand lever known from gasoline pump station nozzles, so that a secure and rapid one-hand operation of the rapid coupling is enabled in a most simple way over extended time periods.

An exemplified embodiment is explained and described below in closer detail by reference to the enclosed drawings, wherein.

Figure 1:
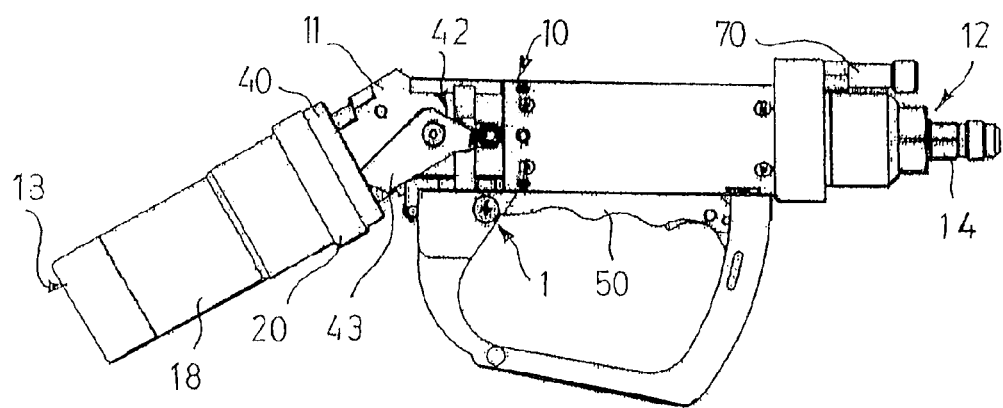
FIG. 1 shows a side view of a rapid coupling for a tank connection.
Figure 2:
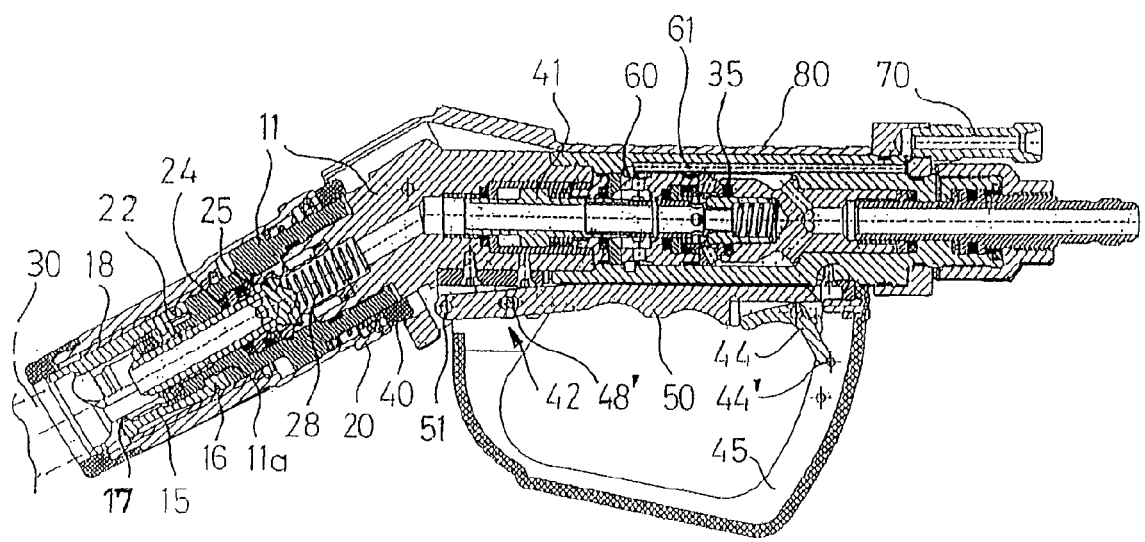
FIG. 2 shows an illustration of the rapid coupling according to FIG. 1 in a longitudinal half section.

FIG. 1 shows an exemplified embodiment of an actuating apparatus 1 for a rapid coupling 10 before the connection to a connecting nipple 30 (cf. FIG. 2). The basic construction of this rapid coupling 10 is known form Applicants' utility model mentioned at the beginning and comprises a tubular, bent housing 11 or mutually connected housing parts, with the right front side being used in this case as an inlet 12 and the left front side as an outlet 13 for conducting the fluid to be transferred to the connecting nipple 30. The inlet 12 to the housing 11 comprises a connection adapter 14 which can be connected to a hose or a pipe for supplying the fluid to be transferred. The connection adapter 14 can be configured to be adapted to the fluid to be transferred, especially the respective feed angles, flow cross sections, etc.

On the face side opposite of the connection adapter 14, namely the outlet 13, several oblong tongs 15 arranged in tubular form are provided as locking elements (cf. FIG. 2) which are spread radially to the outside near insertion on the connecting nipple 30, as is shown for example in WO-A-93/20378 mentioned above. The oblong tongs 15, at least one, generally three or six of which are arranged about the housing 11, are hooked at their right end here into an annular groove 11a of the housing 11 and pre-tensioned by an annular spring 16, so that the tongs 15 are spread radially to the outside. At the left end here on the inwardly bent surface, the tongs 15 each comprise positive-locking engagement profiles 17 which are configured correspondingly to the connecting nipple 30.

An outer sliding sleeve 18 is provided about the tongs 15, which sleeve is held on the cylindrical outside jacket of the housing 11 and can be advanced axially with the actuating apparatus 1 in the direction towards the connecting nipple 30, as will be explained below. The sliding sleeve 18 here comprises an extension 20 which allows the axial displacement of the sliding sleeve 18 towards the actuating apparatus 1 in the middle region of the rapid coupling 10, as a result of which the tongs 15 are arrested by the wrap-around by means of the sliding sleeve 18 in the connecting position.

As is shown in the longitudinal sectional view of FIG. 2, a sealing piston 22 is guided on the inside surface situated towards the outlet 13 of the housing 11, the front end side of which piston rests on a conically designed sealing surface of the connecting nipple 30. The sealing piston 22 is sealed relative to the tongs 15 with several sealing rings 24 which are inserted at the front end of the housing 11, so that the gaseous and/or liquid fluid flowing substantially along the central axis of the rapid coupling 10 cannot escape to the outside.

Relevant is further an outlet valve 25 which is held centrally in the housing 11. The outlet valve 25 is pressured by a pressure spring 28 which is guided in the housing 11. Said outlet valve 25 ensures that in the uncoupled position illustrated here and through to shortly before the connection of the rapid coupling 10 to the connecting nipple 30, respectively, the fluid supplied by the connection adapter 14 cannot flow out, even with opened connecting cock on the filling station.

The outlet valve 25 is axially displaced by the sealing piston 22 upon insertion of the rapid coupling 10 on the connecting nipple 30 and the outlet valve 25 is hereby opened. In this case, however, an inlet valve 35 (cf. also FIGS. 3 and 4) of the rapid coupling 10 is still closed, which will only be opened afterwards in the following coupling procedure by actuating apparatus 1 and an associated slide 41, respectively.

Especially relevant here is a sliding ring 40 which is guided on the outer circumference of the housing 11, which is pressured by a lever mechanism 42 and also controls the slide 41. The slide 41 is here guided in the housing 11 and pressured by a pressure spring. As shown in the illustration, the side of the sliding ring 40, which is directed to the inlet 12, is pressured by a pivoting lever 43, as a result of which the same is displaceable from the opened position to the connected or locking position. The pivoting lever 43 is manually swiveled by a hand lever 50, as a result of which simultaneously a stopper 44 is reached on handle 45.

Figure 3:
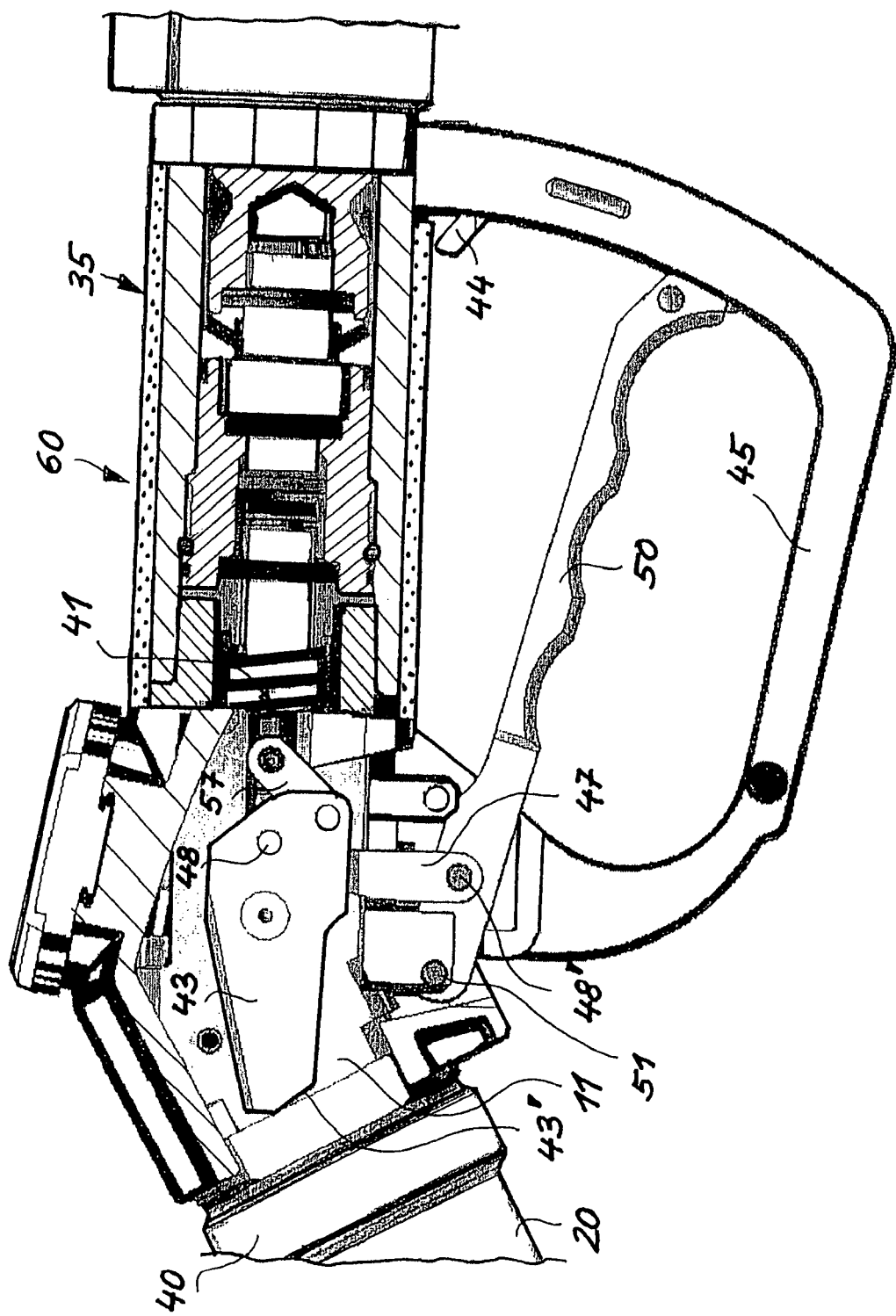
FIG. 3 shows an enlarged illustration of the middle section of FIG. 1.
Figure 4:
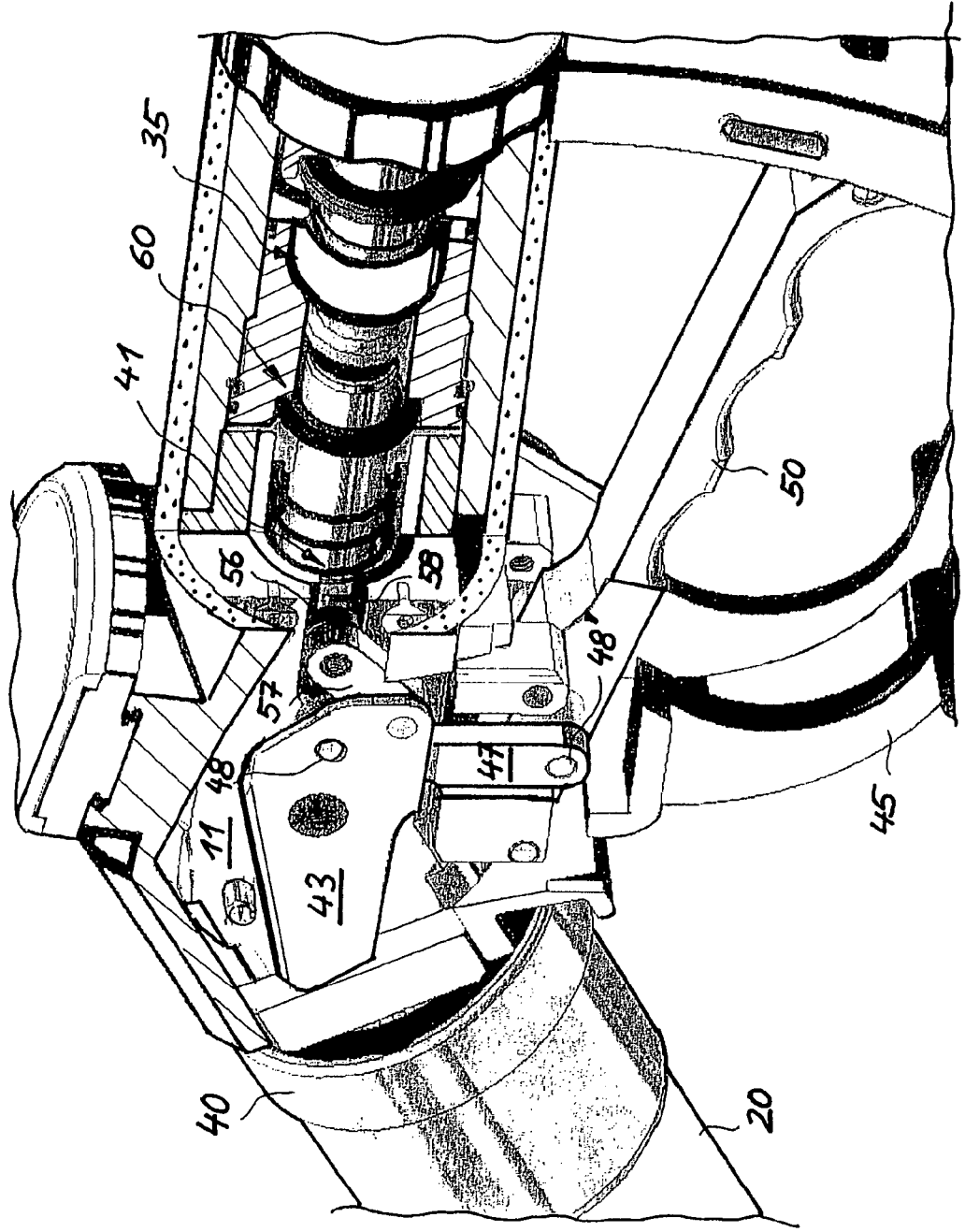
FIG. 4 shows a perspective view according to FIG. 3.

As shown in FIGS. 3 and 4, a connecting lever 57 is of special importance, which on the one hand, is mounted on the pivoting lever 43 and on the other hand, is coupled to the slider 41, namely via a roller 56 guided in a connecting link 58. This results in an actuation of low friction and thus of low maintenance. Additionally, a lever 47 (preferred: two, mirror-inverted) is mounted to the pivoting lever 43 by a pin 48. The lever 47 is connected with the hand lever 50 by a here lower pin 48'. Upon movement of the hand lever 50 about the axis 51, the pivoting lever 43 for actuation of the sliding ring 40 is moved by the lever 47, but at the same time also the connecting lever 57, such that the roller 56 moves in an axial direction within the connecting link 58. The slide 41 is thereby pushed against the inlet valve 35, so that the same is moved to the opened position. In this case, the slide 41 is pressured by a pressure spring. Preferably, the slide 41 is provided there not only for the controlled opening of the inlet valve 35, but also for actuating a venting valve 60. This leads (as shown in FIG. 2) to a venting connection 62 via a bore 61 arranged in the housing 11, so that any gas or fluid remaining in the rapid coupling can be returned. This venting valve 60 which is also co-actuated by the slide 41 also facilitates uncoupling, because a defined pressure decrease can thus occur. As may be seen especially from FIG. 4, the lever 47 is bent toward the upper pin 48 to provide the connecting lever 57 with enough room for mounting on the pivoting lever 43 and realize an advantageous multiplication ratio.

In addition to the low-maintenance bearing, the arrangement shown here has also the advantage of achieving a large force multiplication ratio, so that the slide 41 connected therewith can raise very high valve opening forces, for example upon the inlet valve 35 and the venting valve 60. This ratio is also supported by the lengths of the levers 47 and connecting levers 57, respectively. Notice must be taken that such a lever mechanism is arranged in a symmetrical manner on both sides.

As may be seen from the synopsis of the drawings, the sealing piston 22 is displaced to the right when the rapid coupling 10 is inserted on the connecting nipple 30, whereby the sliding ring 40 provided on the outer circumference is simultaneously displaced to the left with the pivoting lever 43. After a short path of a few millimetres, the tongs 15 are released from their locked position, so that they can snap inwards, and thus the engagement profile engages the correspondingly formed connection profile of the connecting nipple 30. This releases the sliding sleeve 18 to move axially to the left practically at the same time, because the sliding sleeve 18 is also pressured by the actuating apparatus 1 via the sliding ring 40. The axial movement of the sliding sleeve 18 causes it to overlap the radially outer ends of the tongs 15, so that they are positively held in their engagement positions on the connecting nipple 30.

For detaching the rapid coupling 10 and thus returning the connecting position to the opening position, the stopper 44 on the handle 45 is slightly pulled back by hand. After a short pivoting path, the hand lever 50 is released first (downwardly), as a result of which the sliding sleeve 18 is finally retracted. The tongs 15 can thus spread radially to the outside again, with the slide 41 being displaced simultaneously, here to the left, toward the outlet side 13. Due to the curved profile of the front surface 43' at the pivoting lever 43, this stroke movement of the sliding ring 40 can be performed very accurately. Thus, before the sealing contact between the sealing piston 22 and the sealing surface of the connecting nipple 30 is detached, furthermore, the outlet valve 25 is securely closed. As a result of this virtually simultaneous sequence, a very rapid closure of the inlet and outlet valves 35 and 25, respectively, is achieved, so that no fluid volume is allowed to escape.

The sliding ring 40 in combination with the suggested lever mechanism 42 also allows a safe, smooth-running insertion of the rapid coupling 10 on the connecting nipple 30, with the tongs 15 only being closed when the sealing contact is ensured, because the opened position of the tongs 15 is maintained until the opened position of the tongs 15 is released by the axial displacement of the sealing piston 22 and the sliding ring 40 in direct sequence in order to produce the connection.

FIGS. 3 and 4 show an enlarged illustration, with corresponding components being designated with the same reference numerals as in FIGS. 1 and 2. In this case, the actuating apparatus 1 has the same function as described with FIGS. 1 and 2. The gas passage is released as a result of the axial movement (to the right in this case) of the slide 41 actuated by the connecting lever 57 which is relevant here. Further coupled to the connection adapter 14 (cf. FIGS. 1 and 2) is a hose pipe 70 surrounded by an encasing 80. This encasing 80 is at the same time formed as a handle.

The invention claimed is:

1. An actuating apparatus for a rapid coupling for transferring gaseous and/or liquid fluids, comprising a tubular housing and a slide which is mounted in a manner that enables it to be displaced relative to the housing and which is coupled with a lever mechanism having a pivoting lever which is laterally mounted on the housing, wherein at least one connecting lever leading toward the slide is mounted on the pivoting lever, wherein the pivoting lever is connected with a hand lever, and wherein a second lever leading toward the hand lever is pivoted on the pivoting lever in addition to the connecting lever.

2. An actuating apparatus according to claim 1, wherein two pivoting levers are provided on both sides on the housing in a mirror-inverted manner.

3. An actuating apparatus according to claim 1, wherein the front surface of the pivoting lever(s) pressures a sliding ring.

4. An actuating apparatus according to claim 1, wherein the connecting lever rests on a roller on the side of the slide.

5. An actuating apparatus according to claim 4, wherein the roller is guided in a connecting link neighbouring the slide.

6. An actuating apparatus according to claim 3, wherein the sliding ring is guided on the outer peripheral area of the housing.

7. An actuating apparatus according to claim 1, wherein an outlet valve and/or an inlet valve and/or a venting valve are provided centrally in the housing, and the venting valve can be actuated by the slide.

8. An actuating apparatus according to claim 3, wherein a front surface of the pivoting lever comprises an initially flatter incline for producing a force multiplication on the sliding ring.

9. An actuating apparatus according to claim 1, wherein the second lever is bent.

10. An actuating apparatus for a rapid coupling for transferring gaseous and/or liquid fluids, comprising a tubular housing and a slide which is mounted in a manner that enables it to be displaced relative to the housing and which is coupled with a lever mechanism having a pivoting lever which is laterally mounted on the housing, wherein at least one connecting lever leading toward the slide is mounted on the pivoting lever, wherein the connecting lever rests on a roller on the side of the slide.

11. An actuating apparatus according to claim 10, wherein two pivoting levers are provided on both sides on the housing in a mirror-inverted manner.

12. An actuating apparatus according to claim 10, wherein the front surface of the pivoting lever(s) pressures a sliding ring.

13. An actuating apparatus according to claim 10, wherein the roller is guided in a connecting link neighbouring the slide.

14. An actuating apparatus according to claim 12, wherein the sliding ring is guided on the outer peripheral area of the housing.

15. An actuating apparatus according to claim 10, wherein an outlet valve and/or an inlet valve and/or a venting valve are provided centrally in the housing, and the venting valve can be actuated by the slide.

16. An actuating apparatus according to claim 10, wherein the pivoting lever is connected with a hand lever.

17. An actuating apparatus according to claim 12, wherein the front surface of the pivoting lever comprises an initially flatter incline for producing a force multiplication on the sliding ring.

18. An actuating apparatus according to claim 17, wherein a second lever leading toward the hand lever is pivoted on the pivoting lever in addition to the connecting lever.

19. An actuating apparatus according to claim 18, wherein the second lever is bent.

\* \* \* \* \*